A. J. MAHANAY.
DEVICE FOR EXTERMINATING BOLL WEEVIL.
APPLICATION FILED MAR. 6, 1908.

910,933.

Patented Jan. 26, 1909.

Witnesses
Gertrude Manning
A. B. Decker

Inventor
Andrew J. Mahanay
By Delbert H. Decker
Attorney

UNITED STATES PATENT OFFICE.

ANDREW J. MAHANAY, OF ARLINGTON, TEXAS.

DEVICE FOR EXTERMINATING BOLL-WEEVIL.

No. 910,933.

Specification of Letters Patent.

Patented Jan. 26, 1909.

Application filed March 6, 1908. Serial No. 419,500.

*To all whom it may concern:*

Be it known that I, ANDREW J. MAHANAY, a citizen of the United States, residing at Arlington, in the county of Tarrant and State of Texas, have invented a new and useful Improvement in Devices for Exterminating Boll-Weevil, of which the following is a specification.

This invention relates to means for exterminating plant parasites and is especially designed for the extermination of boll weevil.

The object of the invention is to provide a device which shall be capable of distributing along rows of plants or fields of vegetation a liquid insecticide in a thorough and effective manner and to this end the invention consists in the structure of parts and in their combination for the specified purpose in substantially the manner herein described and claimed.

Figure 1:
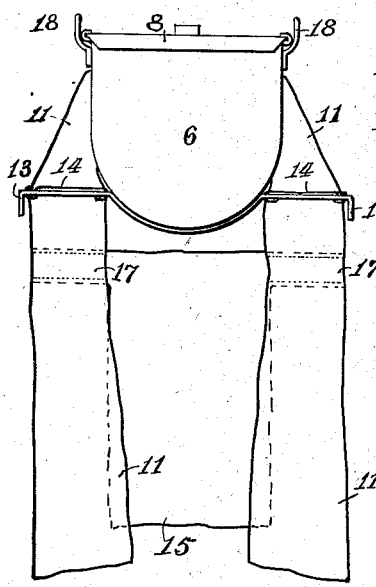
Figure 2:
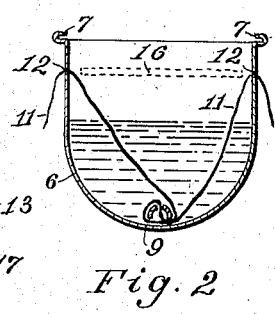
Figure 3:
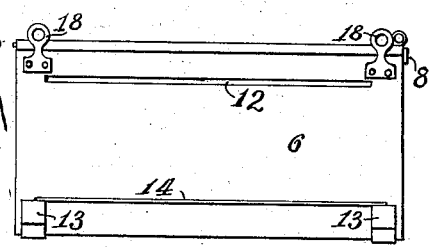
Figure 4:
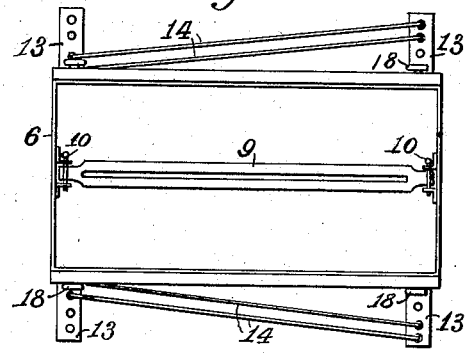
Figure 5:
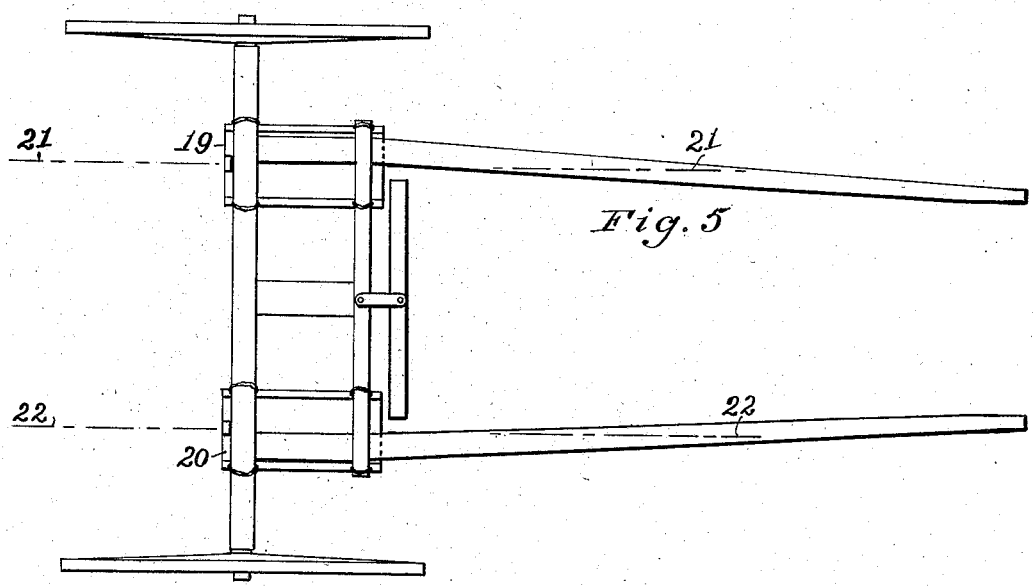

In the accompanying drawings, which form a part of this specification, Figure 1 shows in front elevation, one form of the improved device; Fig. 2 is a transverse vertical section through the body of the receptacle, which contains the liquid insecticide; Fig. 3 is a side elevation of said receptacle, the wicks being removed; Fig. 4 is a plan of the receptacle as seen in Fig. 3; and Fig. 5 is a plan of a wheeled vehicle showing one way in which the device embodying the present invention may be used.

It is designed that the insecticide may be applied by presenting it to the infested vegetation through the medium of wicks or other absorbent material and that the insecticide used shall be of a volatile nature and cause destruction of parasites by impregnating the atmosphere about them. The insecticide, which has been found advantageous for the destruction of many forms of parasites, is some one of the derivatives of petroleum and of these kerosene has been found especially efficacious in the treatment of boll weevil. To distribute this by means of wicks or absorbent material, means economy as well as effective distribution and one way for carrying this into effect is that illustrated in the drawings, wherein 6 indicates a receptacle for the insecticide, which may be made from galvanized iron or like material and, for the utilization of the entire contents of the receptacle, its bottom is preferably cylindrical in form as shown.

A cover of any suitable form may be applied to this receptacle and one is most readily applied by forming guideways in the upper edges of the receptacle, as indicated at 7, in which a sliding cover 8 may readily be inserted.

A wick may be conveniently formed from a strip of any suitable fabric, such as canton flannel, and this strip is preferably secured in the middle of the bottom of tank 6. One convenient manner for so locating the wick is that indicated, wherein a slotted strip of metal 9 has its ends located between ears at the ends of the tank and held down by pins 10. Through the slot in this bar 9 the wick may be passed, substantially as seen in Fig. 2 so that it cannot readily slide through the slot in said bar should one end or the other of the wick be caught on some plant or bush while in use. The length of the depending portions of the wick may be regulated by rolling the wick around the bar. The wick is indicated at 11 and its ends may extend from the receptacle in any suitable way, but preferably through slits 12 in the sides of the receptacle. From these slits the ends of the wick depend, as seen in Fig. 1, said wicks for the sake of clear illustration having been cut short in Fig. 2.

The wicks may hang down in the plane of the sides of the receptacle 6, but preferably their edges are held apart at the forward end of the receptacle so as to permit them to more readily pass along the sides of a row of plants and yet allow the wicks to brush against the plants in passing. This converging arrangement of the wicks may be effected in various ways, one of which consists in attaching strips of metal to the underside of the receptacle 6 and allowing the ends thereof to extend beyond said receptacle as seen at 13. These extensions are perforated and in the perforations wires or cords 14 may be placed parallel to one another and between them the ends of the wick hang. If desired, a third wick, as 15, may be provided and this wick may extend through a slit in the end of the tank, such as indicated in dotted lines at 16 in Fig. 2, or this third wick may be attached, by means of laterally extending straps at its upper corners, to the ends of the wick 11, as indicated at 17 in Fig. 1.

The receptacle thus formed and equipped may be carried over the vegetation to be treated in any way desired. It may be attached to a cultivator in the cultivation of plants, or it may be attached to any other wheeled vehicle. For this purpose it is provided with ears, as indicated at 18, through which wires or ropes may be passed for its suspension. In Fig. 5 the body portion of a horse rake is typified and to this is shown attached two of the insect destroyers just described, one of them at 19 and the other at 20. These are arranged so that each may travel over a row of plants, such rows being indicated by the lines 21 and 22. When it is desired to treat vegetation, which is not in rows, the destroyers may be carried sidewise over the field and the wicks allowed to trail over the plants.

The invention claimed is:—

1. A boll weevil destroyer consisting of a receptacle for containing a destroying liquid and a wick leading from said liquid and extending well beyond the receptacle and adapted to brush against the cotton plants.

2. An exterminator of plant parasites, consisting of a receptacle for containing a destroying liquid and adapted to be carried over infested plants, and an absorbent material leading from said liquid and depending below the receptacle into position to brush against said plants.

3. The combination with a receptacle provided with means for suspending it from a vehicle and adapted to contain a liquid, parasite destroyer, of one or more strips of absorbent material leading from said receptacle into proximity to the infested plants so as to brush against them as the receptacle is carried along.

4. The combination with a receptacle provided with means for suspending it from a vehicle and having slits in its sides near the top, of wicks secured to the bottom of said receptacle to prevent displacement thereof and extending out through said slits and depending below the receptacle to convey a liquid insecticide from the receptacle to infested plants.

5. The combination with a vehicle of an insecticide receptacle adapted to be suspended from the vehicle, of a wick holder removably located in the bottom thereof and wicks secured to said holder and extending therefrom out of the receptacle and depending into proximity to infested vegetation.

6. The combination with an insecticide receptacle adapted to be supported from a vehicle, of wicks extending from the sides thereof, and guides for said wicks for regulating their distance apart and their relative positions.

7. The combination with an insecticide receptacle adapted to be supported from a vehicle, of wicks extending therefrom and depending from opposite sides thereof and a third wick attached to said two wicks at its upper end in a manner to absorb moisture descending therein.

ANDREW J. MAHANAY.

Witnesses:
C. D. KING,
F. W. MAHANAY.